Sept. 11, 1962 E. G. VANDERLIP 3,053,480
OMNI-DIRECTIONAL, VERTICAL-LIFT, HELICOPTER DRONE
Filed Oct. 6, 1959 4 Sheets-Sheet 1

INVENTOR
EDWARD G. VANDERLIP

BY Fred L. Witherspoon, Jr.
& Fred E. Shoemaker
ATTORNEYS

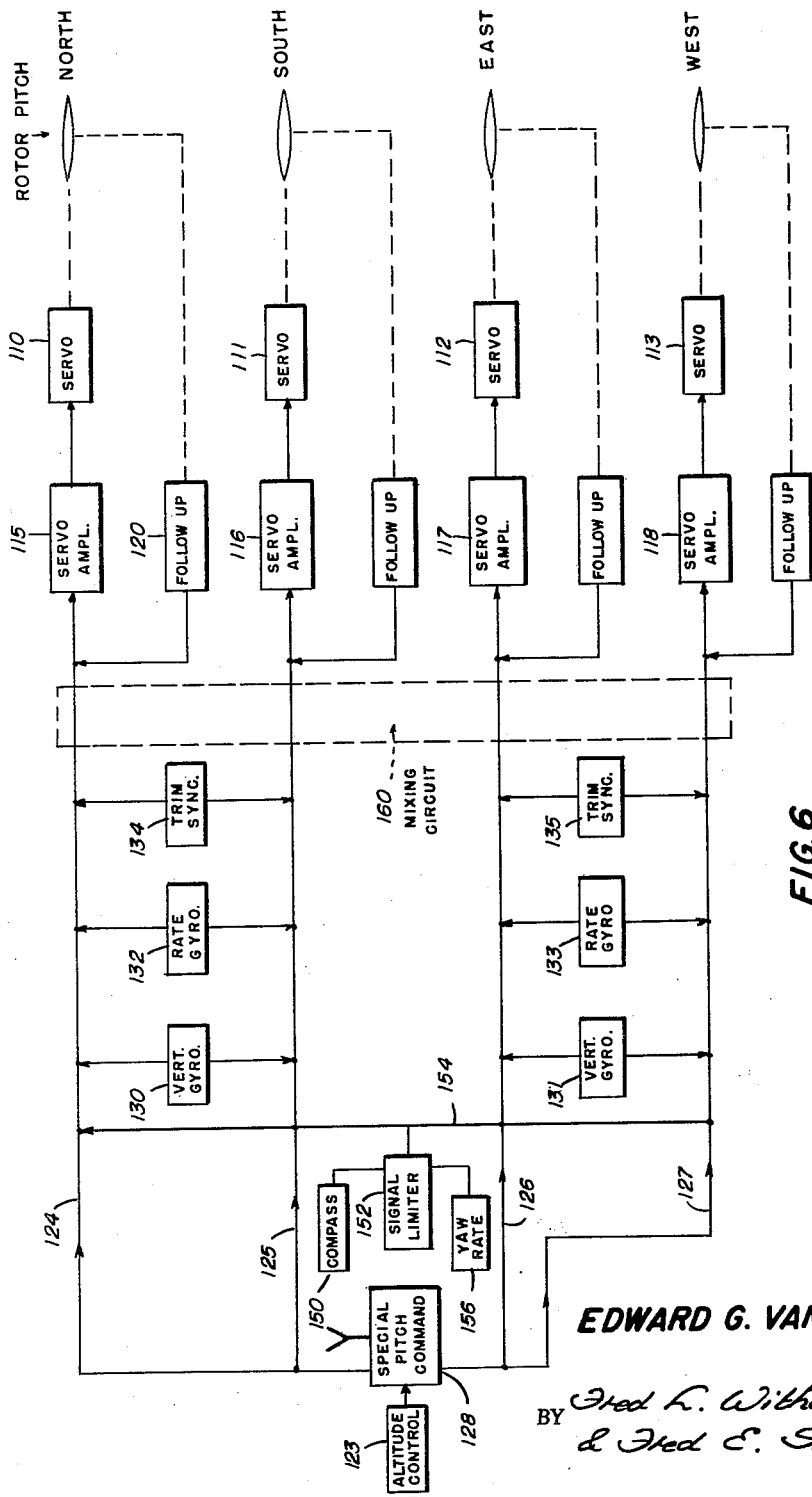

United States Patent Office 3,053,480
Patented Sept. 11, 1962

3,053,480
OMNI-DIRECTIONAL, VERTICAL-LIFT,
HELICOPTER DRONE
Edward G. Vanderlip, Radnor, Pa., assignor to Piasecki Aircraft Corporation, Philadelphia, Pa., a corporation of Pennsylvania
Filed Oct. 6, 1959, Ser. No. 844,673
21 Claims. (Cl. 244—17.13)

This invention relates to helicopters and more particularly to helicopters of the unmanned or so-called "drone" type.

More particularly the invention relates to the construction of and controls for a helicopter drone whereby it is caused to fly with its vertical axis at all times pointed to the zenith and with its orientation constant in spite of direction of flight, under which circumstances flight control is extremely simple, turns are made without banking, and a constant, level platform is provided for instruments, mechanical and electrical equipment, and the like, and all controls and manipulative equipment greatly simplified.

It is a general object of the present invention to provide a helicopter drone of novel construction with unique operational characteristics, improved stabilization, and having advanced control methods and apparatus.

More specifically, it is an object of this invention to provide a helicopter drone having four lift rotors arranged in pairs at opposite ends of horizontal axes of tilt, crossed at right angles with means for tilting simultaneously and in the same direction the axes of rotation of each pair about its axis of tilt.

Another object of the invention resides in the elimination in a helicopter of the need for cyclic pitch change in the rotor blades during lateral movement of the craft and in the use of simple collective pitch adjustment of the blades of each rotor, provision being made for only equal, simultaneous, similar, or dissimilar direction of adjustment of the rotors of each pair.

Still another object of the invention resides in the provision of a four-rotor helicopter drone having similar rotors equidistantly spaced at the ends of 90° disposed axes, the direction of rotation of the rotors on one axis being alike and opposite to those on the other, whereby torque balance is effected, together with means to drive all rotors at the same speed and means to separately and inversely adjust the pitch of the two pairs to correct for inadvertent yaw whereby orientation may be maintained constant or by opposite tilt of either or both pairs of rotors achieve lateral flight in any desired direction.

A further object of the invention consists in the provision of automatic stabilization and control means for the helicopter drone described including rotor-pitch adjustment and rotor-tilt servo means, attitude, altitude, direction, and other condition responsive means and associated command and control devices, mixing circuits, and the like adapted to provide a fully automatic drone capable of holding a position, a course, or an altitude and/or changing any or all of them on radio command.

Among still further objects and features of the invention may be recognized the following:

Constructional characteristics of the fuselage contributing to the stability, lightness, and operability of the drone;

Arrangements for folding the rotors of one pair and their drive and support means to effect major savings in storage space required, especially helpful aboard ships;

Simplified transmission means between the engine and the rotor drive shafts to synchronize the rotors and effect opposite rotation of the pairs;

Mounting of each rotor at the end of a tube housing its drive shaft and arranging the tube for partial rotation to tilt its rotor axis as desired for drone movement in any direction without change in orientation;

Electrically controlling: the collective pitch of the blades on each pair of rotors individually; the tilting simultaneously and in the same direction of the axes of rotation of the rotors at opposite ends of a lateral axis; the collective pitch simultaneously of all rotors for altitude change; and the pitch differentially within a pair for level correction;

Mounting of the multicylinder engine with its shaft vertical and at the center of the craft;

Use of rigid fuselage or frame with the motor rigidly mounted thereon;

Use of a rigid tubular parallelepiped frame with provision for support for fuel tank, radiator, fan, electronic devices, etc., for supplementing the motor and controls;

Mounting aboard the craft of all the instruments necessary for automatic altitude control, level or attitude control, and orientation control;

Mounting aboard the craft a radio transmitter as part of a system for determining craft location, control position, air speed, altitude, etc.;

Arrangement of one or more radio receivers aboard the craft for signalling control commands to the rotor controls for directing the craft;

Electric and electronic equipment and circuits associating and coordinating the instruments, command radio receivers, rotor control apparatus, and necessary servo apparatus, follow-up and stabilization devices, etc.;

Other and further objects and features of the invention will be more apparent to those skilled in the art upon a consideration of the following specification and accompanying drawings wherein is disclosed a single exemplary embodiment of the invention with the understanding that such changes and modifications may be made therein as fall within the scope of the appended claims without departing from the spirit of the invention.

In said drawings:

FIGURE 6 is a diagrammatic and schematic showing of the electric circuits, components, and actuators together with the mechanical linkages associating them with the several rotors for controlling the pitches of the blades of the latter.

Figures 1, 2:
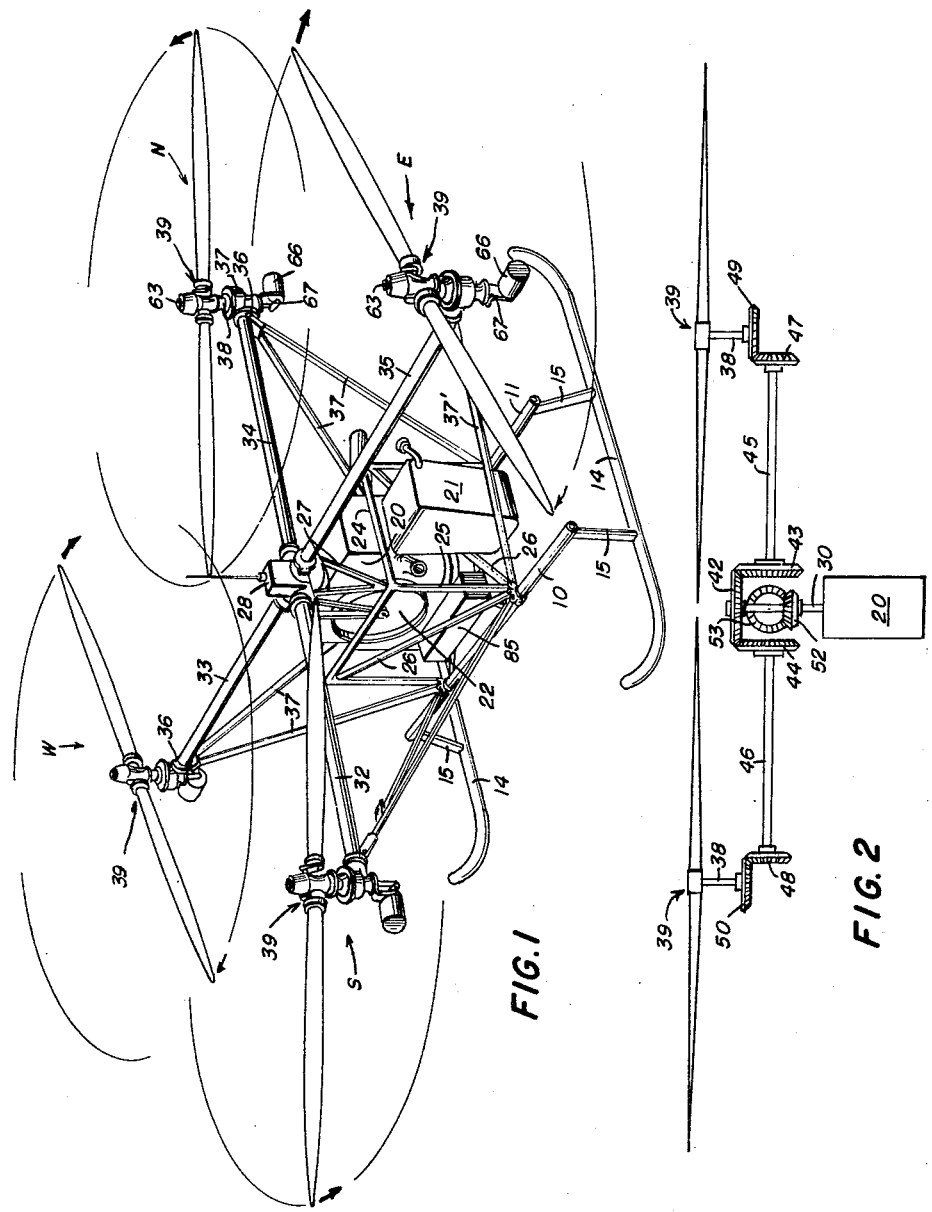
FIGURE 1 is a perspective view of the helicopter disclosing the general layout of components and indicating the directions of rotation of the pairs of rotors.
FIGURE 2 is a diagrammatic showing in side elevation of the engine and propeller disposition and the arrangement of simple drive mechanism for obtaining the opposite rotations of the pairs of propellers.

For the purpose of carrying out various missions of exploratory, military, or other character, for photography, seismology, and the like in relatively inaccessible areas or for simultaneous operations over a number of areas including hostile waters and land, various types of aircraft drones have been resorted to but with indifferent success. Aircraft of the more or less conventional type requiring substantial flight speed for maintaining their elevation are obviously incapable of carrying out missions requiring hovering above one area for a sustained period. Aircraft of the known helicopter types are generally complicated and expensive to construct and maintain and in common with winged-type aircraft require complex control apparatus since the craft must always be oriented in the direction of flight, require banking on turns, and in general, present certain stability problems difficult to solve with automatic operating instruments.

Aircraft of the type described above whether manned or of the drone type have further drawbacks in that they do not present a constant level platform for supporting various types of instruments including cameras for film or television and other types of observing and testing apparatus. Moreover, they not and cannot be made to maintain constant orientation under all conditions of flight as well as maintain a constant, level platform.

In accordance with the present invention, a helicopter drone is provided which provides omni-directional features in that it always maintains the same orientation or heading and a horizontal platform regardless of flight regime or direction of flight. The constant heading is important because it eliminates most of the skill normally required to fly radio-controlled aircraft. The horizontal platform is important primarily in reconnaissance missions where cameras or similar apparatus must be accurately trained. Furthermore, control of horizontal motion may be completely separated from stabilization of level attitude and heading control.

The above results are achieved by a helicopter having four rigid rotors horizontally displaced at equal distances from the center of the airframe in pairs with the rotors of each pair at the opposite ends of one axis and rotating in the same direction while the other pair rotates in the reverse direction at the opposite ends of a second axis, 90° displaced from the first. This balances the torque reactions on the airframe and eliminates the need of a separate or balancing rotor. With the rotors rigid instead of flapping, hinge connections are eliminated.

Direction of flight is controlled by tilting the axes of one or both pairs of rotors in the desired direction of flight. The use of four rotors in oppositely rotating pairs disposed as described eliminates the complexity of cyclic pitch control for the rotor blades as normally found in helicopters. Roll and pitch stability are provided by differential collective pitch of the blades of rotors located at opposite ends of an axis, and yaw stability is provided by differential collective pitch control of the pairs of rotors, the pairs to provide a torque unbalance at the airframe to correct for improper heading and thus maintain constant orientation.

All equipment necessary to maintain constant orientation and level platform during hovering or flight and to maintain constant elevation either above ground or water or by barometric means is under the control of instruments responsive to these conditions aboard the aircraft.

For control of flight direction, both elevational and lateral, and speed, as well as maintaining hovering, radio signals may be transmitted from a remote control position, and received on the aircraft and there generate control voltages which are superimposed on those originating aboard the aircraft by means of a set of mixing circuits whereby to place the control of the craft, as regards position, direction, and speed of flight and elevation, with the remote operator.

Figure 5:
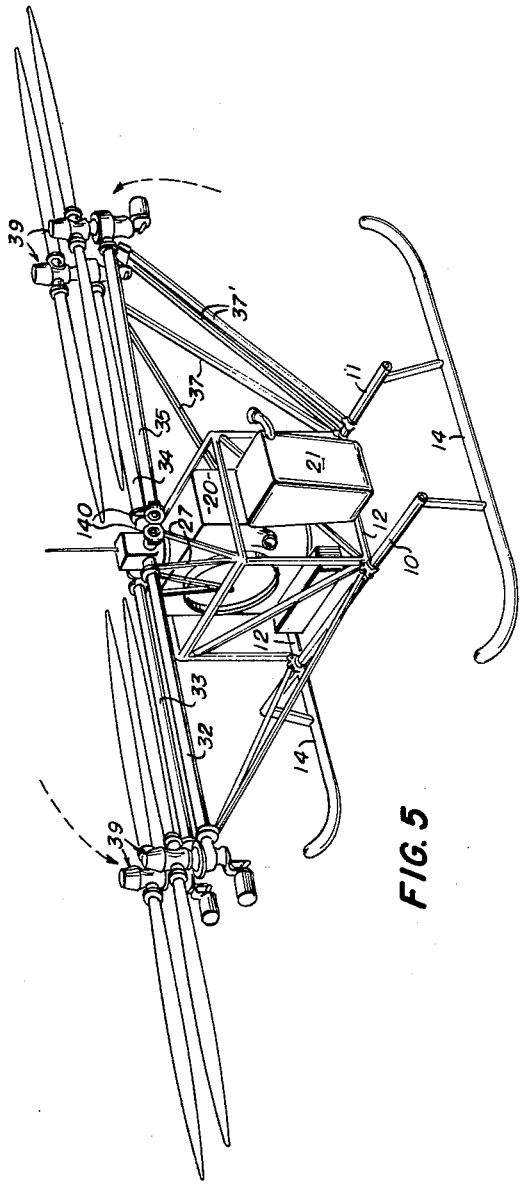
FIGURE 5 is a perspective view similar to FIGURE 1 on a smaller scale but showing one pair of opposed rotor drive tube and shaft assemblies, their supporting arms and brace members rotated substantially 90° from their normal positions to conserve space and facilitate storage, especially aboard ship.

For carrying out the above desiderata, the apparatus is constructed in accordance with the showing in the drawings, to which reference should now be had. For lightness and rigidity, the aircraft is designed about a fuselage appropriately formed of welded metal tubing as best illustrated in FIGURES 1 and 5, where a pair of spaced, parallel, transverse tubes 10 and 11 are connected by longerons, such as 12, and may, if desired, support a platform (not shown) for carrying apparatus for various missions as well as some of the equipment for operation of the craft. A pair of laterally disposed fore-and-aft skids 14, with upturned ends, provide ground support for the aircraft and maintain the operating parts thereof well above ground level by virtue of their attachment by means of substantially vertical posts 15 to the outer ends of transverse tubes 10 and 11 and to intermediate positions along the skids.

A suitable aircraft engine 20 is centrally located in the fuselage and is of the multi-cylinder type with a vertical crank or drive shaft, not shown, and necessary accessories such as gas tank 21, cooling fan 22, fuel pumps, and other essentials of conventional nature.

A rigid tubular frame 24 having horizontal members arranged in a square or rectangle is supported by corner posts 25 from tubular member 10 and 11 and is braced by diagonals as at 26, providing a frame of great rigidity from the corners of which pairs of inclined struts 27, of appropriate size, support the gear box 28 directly above the axis of the motor shaft. This latter is connected to gearing in the box by a direct coupling as shown at 30 in FIGURE 2.

Radiating at 90° intervals from the gear box 30 and in a horizontal plane are the four, equal-length tubes or sleeves 32, 33, 34, and 35 associated with the gear box by joints permitting at least partial rotation of the tubes about their axes. The outer end of each tube is mounted rotatably and nonslidably in a fitting 36 which is supported, from the junctions of adjacent lower ends of upright tubes 25 with the cross tubes 10 and 11 forming the lower corners of the frame surrounding the engine by a pair of inclined, upwardly and outwardly converging struts 37. Each tube and its struts forms a triangular pylon of extreme lightness and strength. Each tube extends nonslidably through its fittings 36 and rigidly mounts at its outer end a housing 37 which journals a vertical shaft 38, carrying at its upper end a propeller-like rotor 39, preferably of two-bladed construction as illustrated.

As depicted in FIGURE 1, the tips of the rotors move in intersecting paths in order to keep the over-all dimension of the craft as small as possible. But as also shown in this same illustration, the rotors at the ends of aligned tubes 32 and 34 move in a counterclockwise direction while those at the ends of tubes 33 and 35 move in a clockwise direction. There is no overlapping of the tip circles of those rotors at the opposite ends of either pair of aligned tubes.

The rotors are driven in the directions illustrated and maintained in the desired phasing which prevents interference by a system of gears and shafts depicted diagrammatically in FIGURE 2 where the engine 20 has its extension shaft 30 carrying at its upper end a large diameter bevel gear 42 which meshes with a pair of like bevel gears 43 and 44 attached to the inner ends, respectively, of oppositely extending shafts 45 and 46, whose outer ends carry like bevel gears 47 and 48 meshed with the bevel gears 49 and 50, mounted respectively at the lower ends of stub shafts 38, each carrying one of the rotors previously mentioned. In this way rotation of the engine in one direction causes equal speed rotation of the two rotors in the same direction.

Shaft 30 carries below bevel gear 42 a second and smaller bevel gear 52 which meshes with a pair of bevel gears of which but one, 53, is illustrated, arranged at the inner ends of shafts corresponding to shafts 45 and 46, but at right angles thereto, and these shafts drive respectively bevel gears at their ends meshed with companion bevel gears on the stub shafts of the other pair of rotors, which are thus caused to rotate in the opposite direction to those driven by main shaft gear 42.

In this manner the helicopter is powered for flight and the torque reactions on the fuselage from the oppositely rotating pairs of rotors are balanced so that the craft has no tendency to rotate about a vertical axis when in flight, if it is assumed that the pitch setting of the blades of all of the rotors is identical. Because of this disposition and rotation of the rotors, the need for cyclic pitch control, as used in all other known forms of helicopters, is wholly eliminated, thereby contributing materially to the simplicity of the rotor construction and of the control apparatus.

Figure 7:
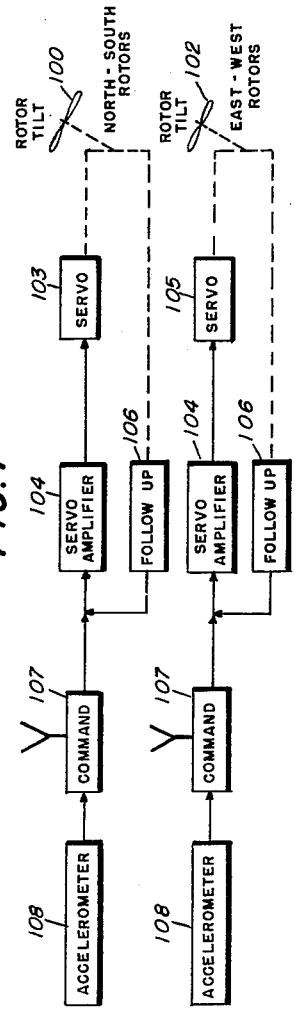
FIGURE 7 is a view similar to FIGURE 6 of the arrangements for adjusting the tilts of the axes of the two pairs of rotors.

Because of the symmetrical distribution of the four rotors on the fuselage, the craft can fly in any direction without heading in that direction. For simplicity of operation and remote control as well as to facilitate use of any special purpose apparatus carried by the craft, the latter always maintains the same heading irrespective of the direction of flight, under the control of apparatus later to be described. It is thus desirable to predetermine the orientation of the craft and adjust the control instruments to maintain it constant. With this in mind the rotors for purposes of identification are arbitrarily designated, respectively, north, south, east, and west, as seen in FIGURES 1, 6, and 7.

Figure 4:
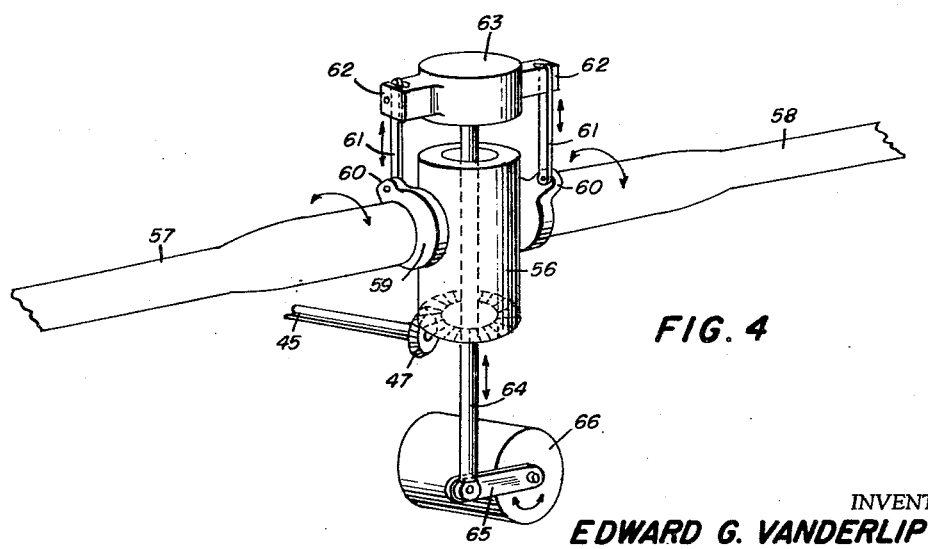
FIGURE 4 is a perspective and schematic view of the pitch-changing mechanism associated with each lifting rotor.

Each rotor is equipped solely with means for collective pitch control of the blades thereof such as illustrated in FIGURE 4. This figure is highly diagrammatic and does not illustrate all of the mechanical details. As shown, the sleeve 56 may be toothed on its lower edge corresponding, for instance, to gear 49 and meshing with pinion 47 driven by shaft 45 such as shown in FIGURE 2. The two blades 57 and 58 of the rotor have their inner ends appropriately journalled in sleeve 56 for rotation about their own axes whereby pitch adjustment is achieved. Such rotation must be in opposite directions for the two blades, as illustrated by the arrows, so each blade has secured thereto a collar 59 having an arm 60 to which is pivoted, as shown, a link 61. The arms 60 are normally directed oppositely, and the two links are pivoted as illustrated in arms 62 extending from head 63, vertically adjustable through the offices of rod 64, articulated to the end of radius arm 65 driven from or by the shaft of motor 66, suspended beneath the gear housing 37, as seen in FIGURE 1, by means of a bracket 67.

By actuating the motor so that its gear-reduced shaft moves in one direction or the other, the pitch of the two blades can be simultaneously increased or decreased to any extent desired, within limits, and then held there by merely stopping the motor. Thus the blades of each rotor may be collectively, but not cyclically, adjusted in pitch.

Figure 3:
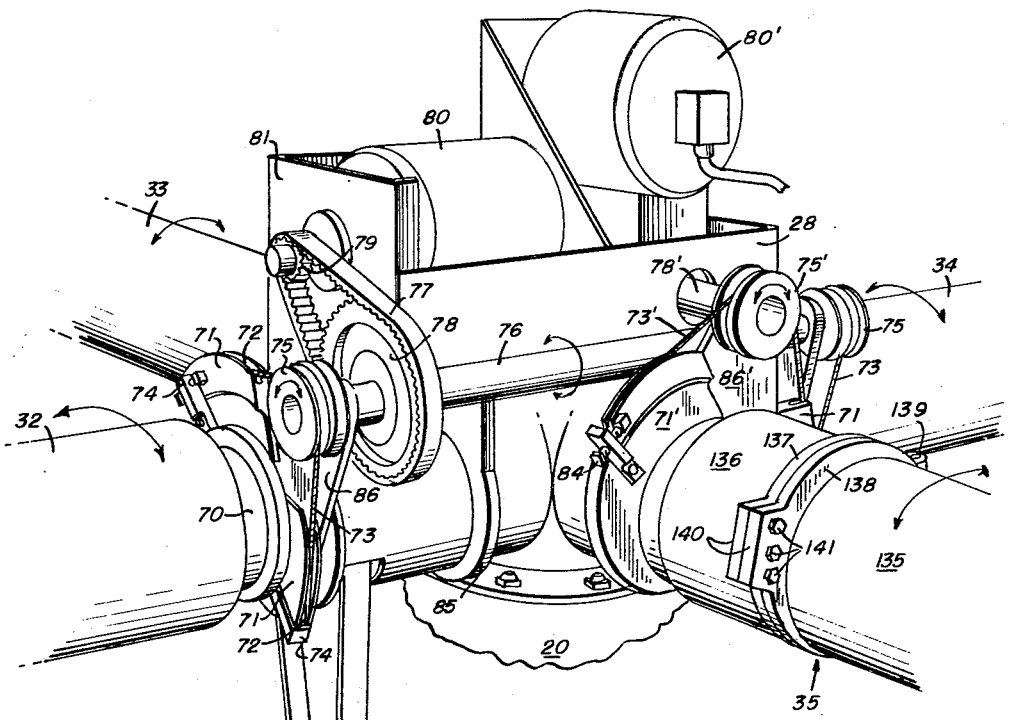
FIGURE 3 is an enlarged perspective view of the structure atop the engine illustrating the drive shaft housing—tubes and the equipment for rotating them in unison in pairs for tilting the axes of the sustaining rotors mounted at their distal ends.

Earlier in this specification mention was made of the ability to rotate each of the propeller-supporting sleeves 32 to 35, inclusive, for the purpose of inclining the axis of rotation of the rotor at its end. FIGURE 3 illustrates in perspective the arrangement and mechanism for achieving such results. Here the sleeves 32 to 35, inclusive, are positioned, as in FIGURE 1, above the motor 20 and radiate from housing 28. The inner end of each sleeve or tube is reduced in diameter as shown in connection with tube 32 at 70, the better to fit it with a pair of arcuate segmental pulleys 71 arranged side-by-side and each having a peripheral groove 72 to accommodate the operating cable 73, which passes oppositely through each groove and is secured in an end member 74.

The two partial pulleys 72 are spaced side-by-side, and the same cable 73 is fastened to end members 74 of both and passes about a turn and one half in a groove in the small diameter pulley 75 mounted on the end of shaft 76, running parallel to one of the sides of the housing 28 and supported therefrom in bearings, not shown. The other end of this shaft has identical pulley, cable, and partial sheave construction, as just described, for actuating tube 34 in unison with tube 32 by the rotation of shaft 76, to a limited degree, by means of the flexible, toothed belt 77 surrounding large diameter sprocket 78 on shaft 76 and pinion sprocket 79 on the shaft of reversible electric motor 80 mounted on end plate 81 of housing 28. This housing also supports a corresponding but 90° displaced shaft 78′, having at its opposite ends the pulleys 75′ connected by cables 73′ to sheaves 71′ on tubes 33 and 35. A second electric motor 80′ connected as motor 80 rotates shaft 78′ in either direction to achieve adjustment of tubes 33 and 35 and hence of the axes of the rotors thereon. It will be seen from this construction that the axes of each pair of rotors at opposite ends of a horizontal axis must move in the same direction, or in other words, always remain parallel with each other.

In order to insure against lost motion due to slackness or stretching of cables 73 and 73′, the ends 74 to which they are attached are adjustable toward and from the grooved portion of their sheaves by means of adjusting screws 84; and since the cables are connected to these, they may be kept as tight as desired and all stretch compensated for.

FIGURE 3 shows bearings 85, each for supporting the inner end of one of the tubes, and supplemental floating bearing plates or spreaders 86 and 86′, each journalled on one of the tubes and one of the shafts 76 or 78′ to act as a thrust plate to prevent distortions due to excess tightness of cable 73.

In order to facilitate storage of the drone and especially aboard ships where space is at a premium, means are provided to permit the hinging of two of the pylons which support the rotors at their outer ends, and FIGURE 5 shows the final result where the tubes 33 and 35 are substantially parallel with 32 and 34 which remain fixed in position. From this figure it will be noted that tubes 33 and 35 normally in transverse alignment across the craft are each adapted to be hinged in a counterclockwise direction. In order that this movement may be effected, in addition to hinges for the tubes and separable connectors for the shafts within them, arrangements must be made to disconnect the lower end at least of one of the supporting struts 37 for each tube, and a more-or-less universal or hinged connection must be arranged to the fuselage for the other. Thus at 37′ are shown the pair of supporting struts 37, for tube 35, after the latter has been folded and they have been reclamped both on the same transverse tubular member 11 of the fuselage. Care must be taken to properly align the rotors, both those of the fixed tubes 32 and 34 and those of the swingable tubes so that the blades thereof are nearly parallel to their tubes and no interference between them occurs. Obviously, appropriate straps or the like may be provided to secure the parts in the folded position.

FIGURE 3 illustrates the manner of hinging the rotor shaft housing tubes for folding. It is shown only on the tube numbered 35 at the lower right and here the outer section 135 is transversely separated from the inner section 136, and each of the abutting ends is fitted with a collar 137, 138. Each collar at diametrically opposite positions has a broad radial extension. Two of these, 139, are formed into a hinge by an appropriate vertical pin while the other two, 140, are arranged to receive through-bolts 141 whereby the sleeves may be held in alignment. The shafts such as 45 and 46, which are housed within the sleeves or tubes, are severed on the same lines as the tubes and adjacent bearings, not shown, carried by the tube sections, support the shaft ends. These ends thus being held in appropriate alignment may be fitted with short splined connecting means which automatically mate as the tubes are brought into alignment, care being taken to adjust the rotors to insure their proper phasing before this takes place. This may readily be achieved by having only one position in which the two shaft sections may be coupled.

The helicopter built as just described has many advantages. First among which is simplicity, for all parts of the frame, motor mount, and the like are rigidly connected together and there are no universal joints, hinges, flexible couplings, or the like, and thus no alignment problems. Only the electronic and control components are shock mounted. Second, the motor is vertical and in the center of a parallelepiped frame of tubular construction, which supports the base and gasoline tank as well as a radiator and, if desired, the electronic devices.

Third, all of the rotors, pylons, gear boxes, and the like are identical in construction, and the simplest of gearing is used for drive. Fourth, the arrangement, sizing, and disposition of the rotors as well as their direction of drive automatically eliminates any rotational torque, and hence no counter-torque mechanism is required with its complex variable speed drive or pitch control. Fifth, the aligned cross tubes simultaneously adjustable in pairs for rotor tilt permit the determination of the direction of flight without changing the orientation of the craft. Sixth, by simplifying the rotors so that they are adjustable only for collective pitch of the blades, many excess components are eliminated.

The rotors in pairs are simultaneously adjustable and are adjustable differentially between pairs for torque unbalance for yaw stability. The rotors on opposite ends of the same axis are differentially collectively pitch adjustable for roll and pitch stability; and lastly, for altitude change the collective pitch of all four rotors may be adjusted simultaneously in the same direction.

To permit achievement of all of the above results, it is best to regulate the engine power by means of a governor operating the throttle so that engine speed is held constant at all times irrespective of the degree of collective pitch given to any or all of the rotors. Lateral speed change is effected by pitch control.

In the construction just described, it will be noted that there is no mechanical interlinkage connecting the several rotors, their only connections being through drive shafts which maintain them always in desired phase and require them to rotate at identical speeds.

As mentioned previously, the aircraft, which preferably flies with one of the tube axes oriented north, is under the combined control of apparatus carried aboard and of radio signals received from a distant command post, preferably equipped with three radio transmitters—one for transmitting signals for controlling the altitude of the craft, one for controlling movement on the longitudinal axis of the craft accomplished by tilting the vertical axes of the rotors on the horizontal transverse axis of the craft, and the third or lateral control accomplished by tilting the vertical axes of the rotors on the horizontal fore and aft axis of the craft. Various known means can be made use of for accomplishing these controls from a single transmitter by time division, frequency change, and other known systems.

The drone is equipped with radio receivers—one for each of the transmitters—for instance, in the compartment illustrated at 85 in FIGURE 1. The output of each of the transmitters is an electrical signal which is arranged to be combined with signals generated aboard the craft for a similar type of control intended to maintain the craft in level condition, oriented, and so on, as pointed out before.

An examination of FIGURE 7 will show the simplest form of combining command and local signals for controlling the tilt of the rotor axes to provide for lateral movement of the craft in any desired direction in accordance with the degree of tilt and the direction thereof imparted to each pair of rotors. Referring now to this figure, it will be noted that the rotors have been designated as respectively, north and south and east and west rotors, and each pair is illustrated by only a single rotor numbered 100 for the north and south pair and 102 for the east and west pair. Since those of each pair are both operated in tilt in the same direction, only a single servo, 103, for the north and south rotors and 105 for the east and west rotors is illustrated. These may be any known devices for converting electrical signals to mechanical energy commensurate therewith, and each is energized by a servo-amplifier of known type designated 104.

Each servo-actuated mechanism moves a follow-up device 106 which detects the degree of adjustment and feeds back a signal to the servo-amplifier to terminate the movement when the desired degree of adjustment has been achieved. Each servo-amplifier is shown as under the control serially of a command radio receiver 107 and of an accelerometer 108. Obviously, the command receiver obtains its signal from the appropriate radio transmitter previously described while the accelerometer is a known type of apparatus aboard the craft for detecting change in rate of movement in the directions controlled by the type of tilt of which its rotors are capable. Thus when the craft is intended to be stationary, each accelerometer detects motion in either direction in which the tilt of its rotors is capable of moving the craft and generates signals to provide opposite tilt for correction against unwarranted or unwanted movement resulting from wind or the like. When the craft is commanded to advance at a predetermined speed, a similar type of correction is effected for wind modification of this speed.

FIGURE 6 illustrates a more complex system of combining those command and local signals which control the pitch of the rotors in various combinations to provide for altitude control, for craft orientation, and to maintain a level condition of flight under all circumstances. In this schematic showing the four rotors are indicated and designated by their north, south, east, and west positions when the craft is properly oriented and each rotor is equipped with a servo device 110, 111, 112, and 113, respectively, capable of simultaneously adjusting the pitch of both blades thereof to either increase or decrease the lift thereof. Such servo device will of course include the motor 66 such as seen in FIGURE 4 and is energized from the appropriate servo-amplifier 115 to 118 under the control of commands from craft-carried instruments and radio signals as well as the associated follow-up device, such as the one designated 120 on the north rotor which provides for a feed-back from the rotor pitch position to the input of the servo-amplifier to limit and maintain the desired setting or commanded adjustment.

The four servo-amplifiers 115 to 118 are simultaneously under the control of an altitude control instrument 123 aboard the aircraft. This may be a barometric-type device, a known type of radio altitude detecting means or apparatus working on the Doppler principle. Through the several conductors 124–127, inclusive, the output of the altitude control instrument 123 is fed in parallel to the four servo-amplifiers to collectively adjust the pitch of all rotors simultaneously to maintain the craft at any given set altitude. For the purpose of changing the altitude of the aircraft by command from a control station, the collective or "special" pitch command radio receiver 128 is connected sequentially with the altitude control and permits a radio signal from the command post to determine the altitude to which the craft is moved. After reaching this altitude, the command is then taken over by the device number 123, which maintains it constant.

To maintain what may be termed a "level platform" or in the vernacular to maintain the craft on an even keel both laterally and fore and aft, a pair of vertical gyros 130 and 131 is provided, one set to detect tilt of the axis between the north and south rotors, and the other, tilt between the east and west rotors. The first of these gyros is connected between conductors 124, 125 to supply opposed signals thereto so that if the north rotor end of the craft, for instance, moves to a higher position than the south one, this gyro reduces the pitch of the north rotor and increases the pitch of the south rotor simultaneously until leveling is achieved while vertical gyro 131 acts the same for the east-west rotors on the transverse axis.

To prevent overcorrection by these vertical gyros resulting in "hunting," their control signal is subject to modulation each by a rate gyro 132, 133. The vertical gyros 130, 131 are also respectively subjected to the action of trim synchronizers 134 and 135.

To maintain the aircraft always with constant orientation despite tendencies to yaw resulting from gusts, cyclonic winds, minor discrepencies in rotor pitch, or in the control of pitch between the east-west and north-south rotors, several instruments are made use of, the first being a compass 150 which may be of the magnetic, gyro type, or any of the numerous others recognized in the aviation industry having an electrical output. This is connected through signal limiter 152 whose function is to slow the rate of yaw correction to prevent hunting about the yaw axis, fed to a conductor 154 then to conductors 124 to 127 in such a manner as to cause simultaneous movement in the same direction of the pitch control servos of the north and south pair and in the opposite direction of the pitch control servos of the east and west pair. It will be remembered from earlier in the specification that in this manner is correction effected about the yaw axis, since the rotors on each axis both rotate in the same direction and oppositely from those on the other axis. Therefore, the axis having the predominant pitch determines the direction of yaw correction.

Also fed through signal limiter 152 is the output from a yaw rate instrument 156 which by having an output regulated in accordance with the rate of yaw controls the action of the signal limiter to insure smooth operation and to prevent oscillation about the yaw axis resulting from overcorrection.

The dotted rectangle 160 marked "mixing circuit" is symbolic of the rather complex electric circuits necessary to bring about the connections and operations of the instruments as above described, but since these are quite similar to those used in autopilots for conventional aircraft with the necessary modifications to effect the more exact and slightly different control essential for this particular craft, it is not believed essential to show the electrical connections in detail.

In operation of the craft, its position can be followed by radar within its range or a complex system of radio established coordinates such as comprised, for instance, in the hyperbolic grid-tracking system of the Raydist or Decca type may be used. These systems provide for a high order of accuracy and may cover an area of several thousand square miles and can be set up on land or sea, or both, with portable or fixed stations. Such systems permit the position of the drone in the tracking system to be communicated from the drone by a transmitter aboard it and to be represented on a screen to an operator who then controls the drone by radio signals as pointed out. Since both the Raydist and Decca systems are well known and since they form no part of the present invention, it is believed that further description is unnecessary here.

The drone may be launched from land or shipboard by visual remote control, and as soon as it is adequately clear of the landing field or ship, control may be transferred to an operator in the command station associated with the radar, Decca, or Raydist system. He may follow the operation of the craft and command its movements by suitable apparatus in control of the three radio transmitters previously described. The operator is thus enabled to move the drone to any point in the grid system set-up, where the mission for which the craft is sent out may be achieved. If the mission requires the craft to be stationary, it is hovered, and the necessary gear put into operation by radio. The automatic stabilization both vertically and laterally with appropriate damping, as provided by the gyros and the other devices previously discussed, simplify the operation of holding the craft stationary, if desired, or by the same token it may be made to fly a predetermined path at a set speed for the taking of photographs, the sending of television pictures, or any similar mission.

Upon the completion of the mission, the equipment is secured and the drone is returned to the launching point where it is landed by remote visual control. More than one drone may be operated in the same electronic grid, making use of the same controls system and radio frequencies, for time controls may be arranged to share the command frequencies. Continuous command signals for drone navigation are not required, since each drone is automatically self-stabilized and will continue the flight path commanded prior to intermission of signals. The signal from each drone may include identifying means so each drone can be recognized on a viewing screen.

I claim:

1. A helicopter drone having in combination, a frame mounting a power plant, four similar, adjustable-pitch rotors, means on said frame supporting said rotors in pairs, the axes of the rotors of each pair being equally spaced from a vertical central axis and normally lying in a plane containing said central axis and intersecting the plane of the other pair at right angles, means connecting said engine to said rotors to drive them all at the same speed with those of a pair in the same direction but with opposite rotation between pairs, means to simultaneously adjust the collective pitch of the blades of all rotors for elevation control, means to differentially adjust the collective pitch between pairs to maintain drone orientation separate means on the drone to detect deviation from a level between rotors of each pair, and mechanism actuated by each said means-to-detect to differentially adjust the pitch between the rotors of its pair to restore said level condition, and means to tilt the rotor axes simultaneously in connected pairs in the same direction for providing lateral motion components.

2. The drone of claim 1 in which the means to simultaneously adjust the collective pitch of all of the rotors is responsive to altitude detecting means aboard the drone, to maintain a fixed altitude.

3. The drone of claim 2 in which means aboard the drone is responsive to command signals originating external to and laterally remote from the drone to also simultaneously adjust the collective pitch of all of the rotors to change the altitude of the drone on command.

4. A helicopter drone having in combination, a frame mounting a power plant, four similar, adjustable-pitch rotors, means on said frame supporting said rotors in pairs, the axes of the rotors of each pair being equally spaced from a vertical central axis and normally lying in a plane containing said central axis and intersecting the plane of the other pair at right angles, means connecting said engine to said rotors to drive them all at the same speed with those of a pair in the same direction but with opposite rotation between pairs, means to simultaneously adjust the collective pitch of the blades of all rotors for elevation control, and means to tilt the axes of the rotors of a pair of rotors simultaneously in the same direction to effect lateral movement of the drone.

5. The drone of claim 4 in which the axis of each pair of rotors is individually tiltable in either direction from the vertical in a plane normal to the plane through the vertical axes of the pair, and means to tilt said axes of the pairs independently.

6. The drone of claim 5 in which the means to tilt the axes of the pairs of rotors is responsive to signals originating external to the drone.

7. A helicopter drone having in combination, a frame mounting a power plant, four similar, adjustable-pitch rotors, means on said frame supporting said rotors in pairs, the axes of the rotors of each pair being equally spaced from a vertical central axis and normally lying in a plane containing said central axis and intersecting the plane of the other pair at right angles, means connecting said engine to said rotors to drive them all at the same speed with those of a pair in the same direction but with opposite rotation between pairs, means to simultaneously adjust the collective pitch of the blades of all rotors for elevation control, means to differentially adjust the rotors of each pair independently from those of the other pair to maintain the drone level, and means to tilt the axes of the rotors in either pair simultaneously in the same direction to effect lateral translation of the drone while maintaining the level condition.

8. The drone of claim 7 in which means aboard the drone is responsive to altitude change, and mechanism responsive to said last-mentioned means to so simultaneously adjust the collective pitches of the rotors as to maintain a selected altitude independently of other rotor adjustments.

9. A helicopter drone having in combination, a fuselage, a centrally mounted engine having a vertical shaft, four shafts of substantially equal length radiating at 90° intervals in a horizontal plane from said vertical shaft, a housing for the associated shaft ends supported from the fuselage, tubes housing said horizontal shafts and each supporting at its outer end a gear box, a vertical stub shaft journalled in each gear box, a bladed rotor carried by the upper end of each stub shaft, gearing connecting the engine shaft to the radiating shafts and the latter to the stub shafts whereby all rotors are driven at the same speed with those of the pair on each axis rotating in the same direction and opposite to the direction of the pair on the other axis, bearings in said housing for the inner ends of said tubes, struts from said fuselage rotatably supporting each tube adjacent the outer end gear box thereon, and power means to simultaneously rotate the tubes of an aligned pair to similarly tilt the stub shafts at their outer ends to provide a lateral component of the thrust of their rotors.

10. The drone of claim 9 in which each of said tubes of one pair is provided with a hinge joint having a vertical hinging axis adjacent said housing whereby each such tube can be swung to parallel one of the fixed tubes to collapse the drone for storage.

11. The drone of claim 10 in which each shaft housed in a hinged tube has a separable connector at the plane of hinging.

12. The drone of claim 10 in which two struts converge from horizontally separated positions on the fuselage to each said hinged tube outer end, means articulating one of each pair of struts to the fuselage and a detachable connection for the other to said fuselage to facilitate collapsing the tube and being arranged to hold it in the collapsed position.

13. The drone of claim 11 in which each rotor has blades of such length that their tip circle intersects only those of the rotors whose axes are 90° displaced therefrom and means in said separable connectors to phase the rotors to prevent blade interference.

14. A helicopter drone arranged to fly as a level platform at all times and including in combination, a power plant, four multibladed rotors each having blades arranged solely for collective pitch adjustment, means driving said rotors all at the same speed from said power plant, means supporting said rotors in pairs on horizontal axes intersecting at right angles, means to detect deviation from the horizontal along each axis and means responsive to the deviation detection on either axis to appropriately differentially adjust the collective pitches of the rotors on said axis to re-establish the level, and rotor attitude adjusting means to achieve lateral drone motion while maintaining said level platform.

15. A helicopter drone arranged to fly with a constant heading at all times and including in combination, a power plant, four multibladed rotors each having blades arranged solely for collective pitch adjustment, means driving said rotors all at the same speed from said power plant, means supporting said rotors in pairs on horizontal axes intersecting at right angles, said driving means rotating the rotors on each axis in the same direction but oppositely on the two axes, means to detect yaw or deviation from said heading and means responsive to such detection to collectively increase the rotor pitches on one axis and collectively decrease the pitches on the other axis to restore the said heading, said responsive means comprising a motor allotted to each rotor and means mechanically connecting each said motor to the blades of its rotor to simultaneously change their pitch.

16. A helicopter drone arranged to fly with a constant heading at all times and including in combination, a power plant, four multibladed rotors each having blades arranged solely for collective pitch adjustment, means driving said rotors all at the same speed from said power plant, means supporting said rotors in pairs on horizontal axes intersecting at right angles between rotors, means for tilting the axes of said rotors, in pairs only and in the same direction, substantially about the said horizontal axes, means to direct signals to said drone commanding lateral movement in any selected horizontal direction, and means responsive to said signals to tilt the necessary rotors about said axes to achieve a flight which is a composite of said tilts.

17. The drone as defined in claim 14 in which means responsive to altitude provides a signal commanding collective pitch adjustment of all rotors for altitude change and follow-up mechanism is provided under the control of each rotor pitch adjusting means, and means actuated by the follow-up mechanism to terminate the responses to said signals when the command is achieved.

18. The drone as defined in claim 16 in which follow-up mechanism is provided under the control of each rotor pair axis tilt, and mechanism actuated by the follow-up mechanism to terminate the responses of the rotor axes tilting means when the flight direction is achieved as directed.

19. A helicopter drone having in combination, a frame, a power plant on said frame, four similar rotors, means on said frame supporting said rotors for rotation about generally vertical axes at the ends of horizontal axes crossed at right angles, means to drive all the rotors from the motor at the same speed, those on each horizontal axis in the same direction but opposite to those on the other horizontal axes, and means to tilt the axes of rotation of the rotors at the ends of and about each horizontal axis in the same direction simultaneously to achieve lateral flight with constant heading.

20. In a helicopter in combination: four similar rotors, a frame mounting said rotors for rotation about substantially vertical axes at the ends of crossed horizontal axes in balanced pairs, means to drive all rotors at the same speed, those on each axis in the same direction but opposite to those on the other axis, and means to tilt rotor axes of each pair together only about their connecting horizontal axis whereby to achieve lateral movement of the helicopter in any direction without change of orientation.

21. The helicopter as defined in claim 20 including means on each rotor to adjust the pitch of all blades thereof simultaneously, means to detect deviation of the helicopter from a level condition, and means responsive to said detecting means to differentially actuate the pitch adjusting means on any deviated axis to restore the level condition.

References Cited in the file of this patent

UNITED STATES PATENTS

| | | |
|---|---|---|
| 1,573,563 | Moore | Feb. 16, 1926 |
| 1,749,471 | Bothezat | Mar. 4, 1930 |
| 2,549,886 | Buivid | Apr. 24, 1951 |
| 2,556,345 | Sivitz | June 12, 1951 |
| 2,629,452 | Alex | Feb. 24, 1953 |
| 2,629,568 | Croshire | Feb. 25, 1953 |
| 2,650,046 | Vanderlip | Aug. 25, 1953 |
| 2,845,239 | Halpert | July 29, 1958 |
| 2,873,075 | Mooers | Feb. 10, 1959 |
| 2,945,650 | Horton | July 19, 1960 |